Patented Sept. 24, 1946

2,408,182

UNITED STATES PATENT OFFICE 2,408,182

DERIVATIVES OF ISOASCORBIC ACID

Percy A. Wells, Abington, and Daniel Swern, Melrose Park, Pa., assignors to The United States of America as represented by Claude R. Wickard, Secretary of Agriculture, and his successors in office No Drawing. Application March 8, 1944, Serial No. 525,540

4 Claims. (Cl. 260—344.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to derivatives of isoascorbic acid, and is more particularly concerned with the preparation of fatty acid esters of d-isoascorbic acid.

We have found that fatty acid esters of d-isoascorbic acid may be prepared by the reaction of calcium 2-ketogluconate with fatty acids, such as lauric and palmitic acids.

In general, our invention comprises dissolving calcium 2-ketogluconate and the fatty acid in concentrated sulfuric acid and maintaining the reaction mixture at a suitable temperature for a length of time necessary to effect esterification. The reaction products are then isolated from the solution by any suitable procedure, such as by dilution followed by solvent extraction.

In effecting the esterification, the use of 90 to 95 percent sulfuric acid is preferred, although other concentrations may be employed if sufficient to dissolve the contents of the reaction mixture and perform the function of an esterification catalyst.

The esterification may be carried out at any temperature, which will not cause any substantial sulfonation or decomposition of the components of the reaction mixture. When 95 percent sulfuric acid is used, satisfactory results are obtained by operating at ordinary room temperatures.

The following examples will more fully explain the invention and illustrate the manner in which it may be practiced:

Example I

The preparation of d-isoascorbyl laurate.—Calcium 2-ketogluconate trihydrate (24 grams; 1/20 mole) was added to 95 percent sulfuric acid (200 cc.) in small portions with good agitation at 5–10° C. When all the calcium salt had been added, lauric acid (16 grams; 1/12.5 mole) was added in small portions, the temperature being maintained at 5–10°. After the lauric acid had been added, the cooling bath was removed and the agitation was continued until room temperature (23–26° C.) was reached. The reaction mixture was then allowed to stand for 24 hours at room temperature. The reaction mixture was then diluted on a large excess of chopped ice and extracted with ether. The ether solution was washed acid free, dried over calcium sulfate and the ether recovered. The product obtained from the ether solution was then washed by decantation three times with petroleum ether (35–60° C.) to remove any unreacted fatty acid. The material insoluble in petroleum ether was crystallized to constant melting point. The d-isoascorbyl laurate obtained, upon being dried under vacuum at 60° C. for one hour, melted at 76.9–78° C. and did not depress the melting point of d-isoascorbyl laurate prepared as described in our copending application for patent Serial No. 442,557, filed May 11, 1942.

Example II

Preparation of d-isoascorbyl palmitate.—In the same manner as described for the preparation of d-isoascorbyl laurate from calcium 2-ketogluconate trihydrate and lauric acid, d-isoascorbyl palmitate was prepared from calcium 2-ketogluconate trihydrate and palmitic acid in sulfuric acid solution, with the exceptions that 32 grams of palmitic acid and 250 cc. of sulfuric acid were used. The d-isoascorbyl palmitate obtained, upon being dried under vacuum at 60° C. for one hour, melted at 87–88° C. and did not depress the melting point of d-isoascorbyl palmitate prepared as described in our copending application for patent Serial No. 442,557, filed May 11, 1942.

Having thus described our invention, we claim:

1. The method of producing fatty acid esters of d-isoascorbic acid said esters containing an unsubstituted ene-diol group comprising reacting calcium 2-ketogluconate with a saturated fatty acid containing 12 to 18 carbon atoms in the presence of concentrated sulfuric acid.

2. The method of producing d-isoascorbyl laurate containing an unsubstituted ene-diol group comprising reacting calcium 2-ketogluconate with lauric acid in the presence of concentrated sulfuric acid.

3. The method of producing d-isoascorbyl palmitate containing an unsubstituted ene-diol group comprising reacting calcium 2-ketogluconate with palmitic acid in the presence of concentrated sulfuric acid.

4. The method of producing d-isoascorbyl stearate containing an unsubstituted ene-diol group comprising reacting calcium 2-ketogluconate with stearic acid in the presence of concentrated sulfuric acid.

PERCY A. WELLS.
DANIEL SWERN.